US005943667A

United States Patent [19]
Aggarwal et al.

[11] Patent Number: 5,943,667
[45] Date of Patent: Aug. 24, 1999

[54] ELIMINATING REDUNDANCY IN GENERATION OF ASSOCIATION RULES FOR ON-LINE MINING

[75] Inventors: Charu Chandra Aggarwal, Ossining; Philip Shi-lung Yu, Chappaqua, both of N.Y.

[73] Assignee: International Business Machines Corporation, Armonk, N.Y.

[21] Appl. No.: 08/868,244

[22] Filed: Jun. 3, 1997

[51] Int. Cl.[6] ........................................ G06F 17/30
[52] U.S. Cl. ...................... 707/3; 707/4; 707/5; 707/10
[58] Field of Search ................................. 707/1, 2, 3, 4, 707/5, 6, 7, 10, 100, 101, 102, 103, 104, 200

[56] References Cited

U.S. PATENT DOCUMENTS

| | | | |
|---|---|---|---|
| 5,615,341 | 3/1997 | Agrawal et al. | 705/10 |
| 5,727,199 | 3/1998 | Chen et al. | 395/606 |
| 5,764,975 | 6/1998 | Taniguchi et al. | 395/606 |
| 5,794,209 | 8/1998 | Agrawal et al. | 705/10 |
| 5,819,266 | 10/1998 | Agrawal et al. | 707/6 |
| 5,842,200 | 11/1998 | Agrawal et al. | 707/1 |

OTHER PUBLICATIONS

Agrawal, R., "Mining Association Rules Between Sets of Items in Large Databases", Proceedings of the ACM SIGMOD Conference on Management of Data, Washington D.C., 1993, pp. 207–216.

Agrawal, R., "Fast Algorithms for Mining Association Rules", Proceedings of the 20th International Conference on Very Large Data Bases, 1994, pp. 487–499.

Srikant, R., "Mining Generalized Association Rules", Proceedings of the 21st International Conference on Very Large Data Bases, 1995, pp. 407–419.

Srikant, R., "Mining Quantiative Association Rules in Large Relational Tables", Proceedings of the 1996 ACM SIGMOD Conference on Management of Data, Montreal Canada (1996), pp. 1–12.

*Primary Examiner*—Wayne Amsbury
*Assistant Examiner*—Srirama Channavajjala
*Attorney, Agent, or Firm*—Scully, Scott, Murphy & Presser; Kevin M. Jordan, Esq.

[57] ABSTRACT

A computer method of removing simple and strict redundant association rules generated from large collections of data. A compact set of rules is presented to an end user which is devoid of many redundancies in the discovery of data patterns. The method is directed primarily to on-line applications such as the Internet and Intranet. Given a number of large itemsets as input, simple redundancies are removed by generating all maximal ancestors, the frontier set, for each large itemset. The set of maximal ancestors share a hierarchical relationship with the large itemset from which they were derived and further satisfy an inequality whereby the ratio of respective support values is less than the reciprocal of some user defined confidence value.

The resulting compact rule set is displayed to an end user at some specified level of support and confidence. The method is also able to generate the full set of rules from the compact set.

7 Claims, 5 Drawing Sheets

ELIMINATING REDUNDANCY IN GENERATION OF ASSOCIATION RULES FOR ON-LINE MINING

FIELD OF THE INVENTION

The present invention relates generally to searching for data dependencies in large databases and more particularly to a method of removing redundancies from association rules discovered in large collections of data.

DISCUSSION OF THE PRIOR ART

The present invention relates generally to on-line data mining, and more particularly to an on-line method for removing redundancies in the generation of association rules. With the rapid growth of the Internet and Intranet, interactive data mining becomes increasingly popular. The importance of discovering and defining association rules as a tool for knowledge discovery in databases has recently been recognized. The volume of data stored in electronic format has increased dramatically over the past two decades. The increase in use of electronic data gathering devices such as point-of-sale or remote sensing devices has contributed to this explosion of available data. Data storage is becoming easier and more attractive to the business community as the availability of large amounts of computing power and data storage resources are being made available at increasingly reduced costs.

With so much attention focused on the accumulation of data, there arose a complimentary need to focus on how this valuable resource could be utilized. Businesses soon recognized that valuable insights could be gleaned by decision-makers who could make effective use of the stored data. By using data mining tools that are effective to obtain meaningful data from millions of bar code sales transactions, or sales data from catalog companies, it is possible to gain valuable information about customer buying behavior. The derived information might be used, for example, by retailers in deciding which items to shelve in a supermarket, or for designing a well targeted marketing program, among others. Numerous meaningful insights can be unearthed from the data utilizing proper analysis techniques.

A problem users experience in applying association rules to real problems is that many uninteresting or redundant rules are generated along with the interesting rules. In general, redundant rules may be defined as those rules which convey no additional information than other generated rules and are less general in scope. In addition, it is useful to eliminate redundant rules simply from the point of view of compactness in representing rules to an online user. Given the time critical nature that is typical of on-line applications such as the Internet and Intranet, decision support is further optimized by presenting decision makers with a compact rule set thereby enabling real-time analysis. As the business community shifts its focus increasingly in the direction of the Internet, the present method is both timely and makes the untapped value in large databases increasingly accessible to a vast audience of potential end users.

It is thus a primary object of the invention to remove from a set of generated association rules, those rules which possess the characteristics of simple and strict redundancy and presenting to an on-line user a compact subset of nonredundant rules.

It is a further object of the present invention to be able to generate the complete set of rules from the subset of non-redundant compact rules.

SUMMARY OF THE INVENTION

The present invention is directed to an on-line method for removing redundancies in the generation of association rules. In order to carry out the object of the present invention, there is disclosed, a method for identifying and eliminating simple and strict redundancies from a set of association rules. The method is directed primarily to on-line applications including the Internet and Intranet. The response time associated with making on-line queries of a large database is made acceptable by virtue of the method's computational efficiency. Since multiple queries on a database for association rules are typically required to find appropriate levels of support and confidence, presenting a compact set of non-redundant rules to an on-line user streamlines the decision making process by displaying only the most interesting or non-redundant rules to an on-line user. The present invention assumes that large itemsets are already available as input. From these large itemsets a compact set of non-redundant association rules are generated in two stages. The first stage involves removing simple redundancies. This stage is executed by generating the set of maximal ancestors of the large itemsets, the frontier set. The frontier sets are subsets of the large itemsets. The second stage takes the frontier set as input and prunes them to remove any strict redundancies. The pruned frontiers are then used to generate the compact set of non-redundant rules for presentation to an on-line user.

DETAILED DESCRIPTION

Figure 1:
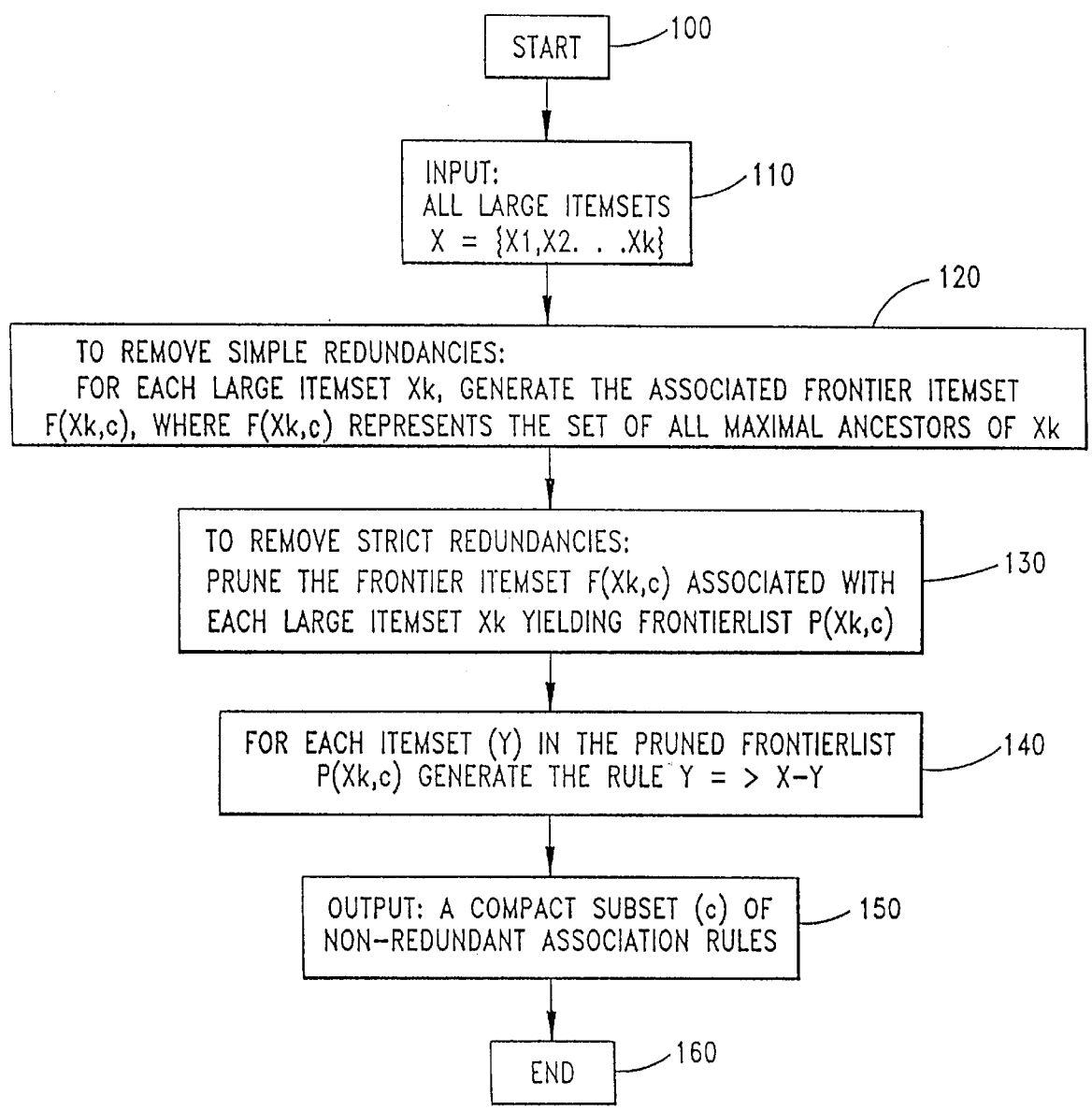
FIG. 1 is an overall description of how the rules are generated from the large itemsets while avoiding redundancy.

The present invention is directed to an on-line method for removing redundancies in the generation of association rules. The input to the process described herein consists of a large collection of raw data. Such data might exist in flat files or databases. Typically the data will be formatted as a series of records wherein each record is composed of a number of fields. Each field might represent, for example, particular items stocked by a retail establishment.

Consider, for example, a supermarket with a large collection of stockable items. Typical business decisions associated with the operation concern what to put on sale, how to design coupons, and how to place merchandise on shelves in order to maximize profit, etc. Analysis of past transaction data is a commonly used approach in order to improve the quality of such decisions. Modern technology has made it possible to store the so called basket data that stores items purchased on a per-transaction basis. Organizations collect massive amounts of such data. The problem becomes one of "mining" a large collection of basket data type transactions for association rules between sets of items with some minimum specified confidence. Given a set of transactions, where each transaction is a set of items, an association rule is an expression of the form X=>Y, where X and Y are sets of items. An example of an association rule is: 30% of transactions that contain beer also contain diapers; 2% of all transactions contain both of these items". Here 30% is called the confidence of the rule, and 2% the support of the rule.

Another example of such an association rule is the statement that 90% of customer transactions that purchase bread and butter also purchase milk. The antecedent of this rule, X, consists of bread and butter and the consequent, Y, consists of milk alone. Ninety percent is the confidence factor of the rule. It may be desirable, for instance to find all rules that have "bagels" in the antecedent which may help determine what products (the consequent) may be impacted if the store discontinues selling bagels.

The problem of discovering association rules is to find all rules which satisfy user-defined minimum support and minimum confidence criteria. A problem users experience in applying association rules to real problems is that many uninteresting or redundant rules are generated along with the interesting rules. It is useful to eliminate redundant rules simply from the point of view of compactness in representation to an online user. For example, if the rule X=>YZ is true at a given value of minsupport and minconfidence, then rules such as XY=>Z, XZ=>Y, X=>Y, AND X=>Z are redundant. In fact, in most cases, the number of redundant rules is significantly larger than the number of essential rules, and having too many redundant rules defeats the primary purpose of data mining in the first place.

While the prior art has discussed methods for generating association rules, the present invention describes how redundancy is eliminated from the generated rules.

The present invention presumes the existence of a large database containing individual records, which could represent, for example, individual retail sales transactions T. Each sales transaction, T, in the database would be comprised of one or more selected store items from the set of all store items I, where I={i1,i2, . . . ,im}.

For example, a typical database for a supermarket might consist of the following point-of-sales transactions where each transaction, T, consists of a set of purchasable store items, an itemset, from the set I.

| Transaction (1) | = | milk, bread, cheese | = | itemset 1 |
| Transaction (2) | = | milk | = | itemset 2 |
| Transaction (3) | = | soap, bread | = | itemset 3 |
| . | | | | |
| . | | | | |
| . | | | | |
| Transaction (10000) | = | cookies, juice | = | itemset 10000 |

For each transaction, T, each item, i, has a (zero or one) designation for that transaction, depending upon whether or not that item was purchased.

Given a set of transactions,D, the problem of mining association rules is to find all rules that have support and confidence greater than the user-specified minimum support (minsupport) and minimum confidence (minconfidence). Generally, the support of a rule X=>Y is the percentage of customer transactions, or tuples in a generalized database, which contain both X and Y itemsets. In more formal mathematical terminology, the rule X=>Y has support s in the transaction set D if s% of transactions in D contain X union Y, X U Y. The confidence of a rule X=>Y is defined as the percentage of transactions that contain X also contain Y. Or more formally, the rule X=>Y has confidence c in the transaction set D if c% of transactions in D contain X also contain Y. Thus if a rule has 90% confidence then it means that 90% of the transactions containing X also contain Y.

As previously stated, an association rule is an expression of the form X=>Y. For example if the itemsets X and Y were defined to be X=[milk & cheese & butter]
Y=[eggs & ham]

The rule may be interpreted as:

RULE : X=>Y , implies that given the occurrence of milk, cheese and butter in a transaction, what is the likelihood of eggs and ham appearing in that same transaction to within some defined support and confidence level.

Several approaches have been proposed in the prior art for mining data dependencies with a focus on finding association rules from very large sets of transaction data. The primary idea proposed, in Agrawal R., Imielinski T., and Swami A., "Mining association rules between sets of items in very large databases", Proceeding of the ACM SIGMOD Conference on Management of data, pages 207–216, Washington D.C., May 1993, was an itemset approach in which first all large itemsets are generated, and then these large itemsets are used in order to determine data dependencies. Subsequent work has primarily concentrated on this approach. The itemset approach involves generating all combinations of items from the set I={i1,i2, . . . im) that have fractional support above a certain user-defined threshold called minsupport. All such combinations are referred to as large itemsets. Given a large itemset, S, which satisfies the support constraint, it can then be used to generate rules of the type S−X=>X for each X which is a subset of S. Once all such rules have been generated, only those rules above a certain user defined threshold called minconfidence may be retained. An issue while generating (mining) association rules is that a large percentage of the rules may be redundant. For example, if the rule X=>YZ is true at a given value of minsupport and minconfidence, then rules such as XY=>Z, X=>Y, and X=>Z are redundant.

The present invention assumes that the large itemsets are already available, see step 110 of FIG. 1. The prior art discusses methods for finding the large itemsets: see Agrawal et al., "Mining Association Rules Between Sets of Items in Large Databases", Proc. of the ACM SigMod Conference on Management of Data, Washington, D.C., 1993; Agrawal et al. "Fast Algorithms for Mining Association Rules in Large Databases", Proc. of the VLDB Conference, Santiago, Chile, 1994; Houtsma et al., "Set-Oriented Mining of Association Rules", IBM Research Report, RJ 9567, October, 1993; and Mannila et al. "Efficient Algorithums for Discovering Association Rules", KDD-94:*AAAI Workshop on Knowledge Discovery in Databases*, July, 1994. The second stage, rule generation, has not been explored extensively in the prior art [RAK93, RAK94], and therefore does not address the issue of removing redundancies in generating association rules. The present invention describes a method for removing redundancies from large itemsets while generating association rules.

FIG. 1 is a high level flowchart which considers the removal of two kinds of redundancies; simple and strict. Simple redundancies must be removed prior to removing strict redundancies and will therefore be discussed first. Assume itemset X is input to the process, consider the two rules having been generated from X, where;

Rule 1 : A=>B and
Rule 2 : C=>D which satisfy the following $$A \cup B = C \cup D \qquad \text{(Eq. 1)}$$

In Equation 1, the unions of the antecedent and consequent are equal. If itemset C is also a superset of itemset A then rule 2 is said to bear simple redundance with respect to rule 1.

The example illustrates the two necessary and sufficient conditions for simple redundancy to exist.

TABLE I

SIMPLE REDUNDANCY EXISTS WHENEVER

1ST CONDITION the unions of the antecedents and the consequents of the two respective rules are equal.

2ND CONDITION the antecedent of rule 2 is a superset of the antecedent of rule 1.

The first condition is equivalent to the statement; the support level of the respective rules are equal. This is true by definition, recall that the "support level" was previously defined as the union of the antecedent and the consequent.

Also note that in the situation where simple redundancy exists, the confidence value for one rule is strictly larger than the confidence value for the other. Hence, in the case of simple redundancy, one rule dominates the other based on the confidence, whereas the rules are equivalent in terms of support.

The second category of redundancy addressed by the present invention concerns strict redundancy. In general, strict redundancy exists whenever one rule dominates the other based on both support and confidence. The test for strict redundancy is illustrated in Table II;

TABLE II

TEST FOR STRICT REDUNDANCY

1ST CONDITION the unions of the antecedents
and the consequents of Rule 1
Is a superset of the union of the antecedent
and consequence of Rule 2.

2ND CONDITION

The antecedent of rule 2 is a superset
of the antecedent of rule 1.

The following example further illustrates the two necessary and sufficient conditions for the case of strict redundancy.
Assume:
RULE 1 : A=>B : milk=>bread, butter, cheese
RULE 2 : C=>D : milk,cheese=>butter The unions of the antecedents and consequences of the two rules are found to be;
A union B={milk,bread,butter,cheese} and
C union D={milk,butter,cheese}
Condition 1 is satisfied because the union of the antecedent and consequence of rule 1,(A union B), is a superset of the union of the antecedent and consequence of rule 2, (C union D) by virtue of containing the additional element, bread.
Condition 2 is satisfied because the antecedent of rule 2, (milk,cheese} is a superset of the antecedent of rule 1, {milk}. Rule 2 is therefore strictly redundant with respect to Rule 1.

Prior to describing the process of removing redundancies, some additional definitions are required as background. An itemset C is said to be a descendant of an itemset D if D can be obtained from C by removing some items. Correspondingly, the itemset C is said to be an ancestor of itemset D if itemset C can be obtained by adding some items to D. Furthermore, whenever an itemset can be obtained by the removal or addition of only a single item, those itemsets are said to share a parent/child relationship. See 1 and 2 below;

ITEMSET C={p,q,r,s,t,u,v,w,x,y,z} [ANCESTOR]
ITEMSET D={v,w,x,y,z} [DESCENDENT]

1 (ancestor/descendent)

ITEMSET D={p,q,r,s} [PARENT]
ITEMSET C={p,q,r,s,t} [CHILD]

2 (parent/child)

The present method addresses the removal of simple redundancy as a prerequisite to removing strict redundancies. Large itemsets, $X=\{X1,X2,\ldots Xk\}$, are assumed to be already available as input. To address the removal of simple redundancies it is first necessary to identify the set of maximal ancestors for each large itemset contained in the set X. For an itemset to qualify as a maximal ancestor of an itemset X, at some confidence level c, two conditions must be satisfied.

TABLE III

TEST FOR WHEN AN ITEMSET (Y) IS
A MAXIMAL ANCESTOR OF ANOTHER ITEMSET (X)

CONDITION 1

$s(Y)/s(X) < 1/c$

CONDITION 2 no parent of Y, (i.e. Z)
satisfies $s(Z)/s(X) <= 1/c$

Only maximal ancestors are relevant in generating itemsets which avoid simple redundancy. The set of all maximal ancestors for a given large itemset Xi, at some confidence c, is defined as the frontier set, denoted by F(Xi,c).

Figure 2:
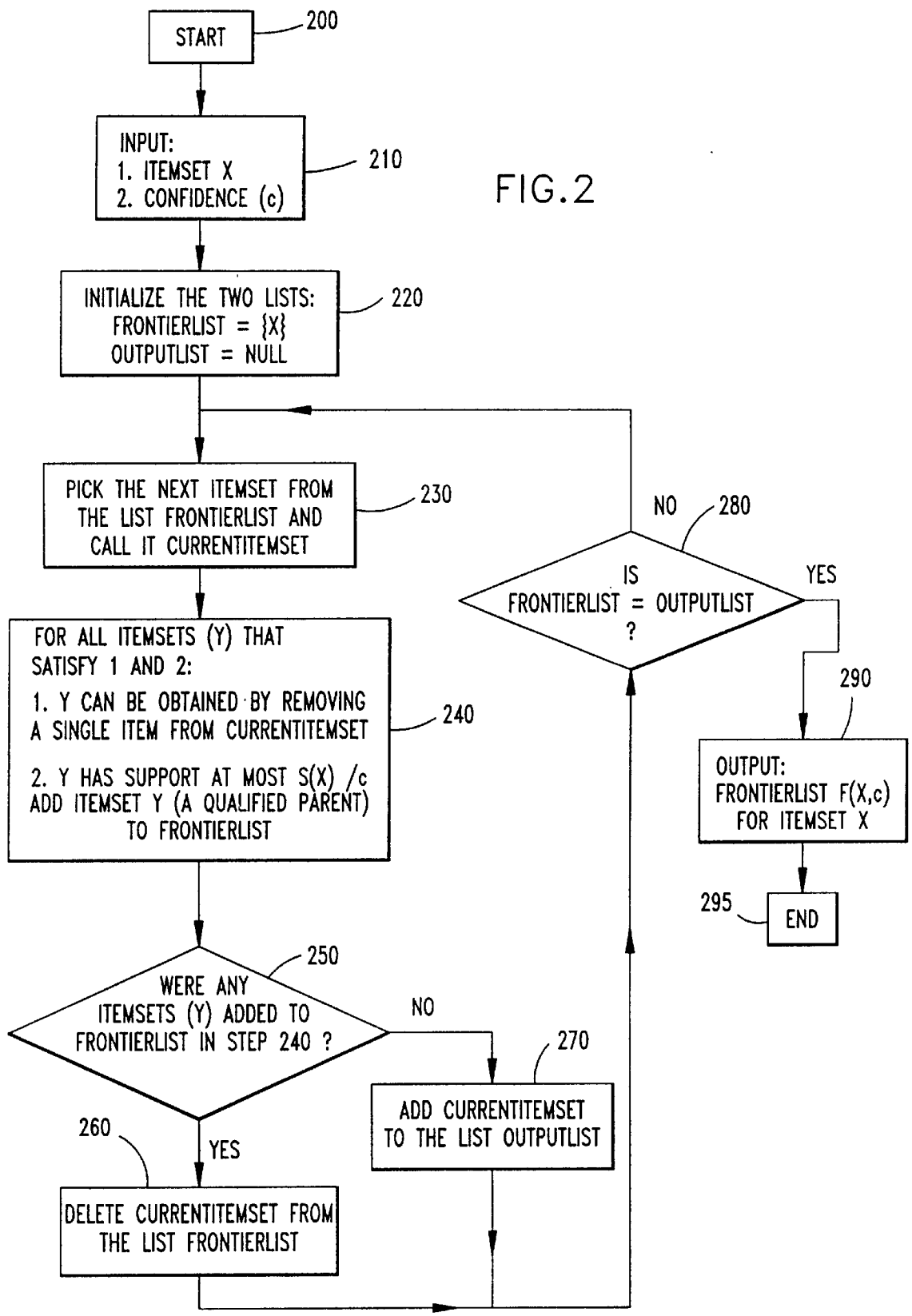
FIG. 2 is a description of the process of generation of the frontier itemsets for a given itemset. This figure can also be considered a detailed description of step 120 of FIG. 1.

FIG. 2 is the detailed flowchart of the process of generating the frontier set, given a large itemset Xi as input. FIG. 2 is also a detailed description of step 100 of FIG. 1. The process steps of FIG. 2 will be performed for each large itemset in the set X, where $X=\{X1,\ldots Xk\}$. The output of FIG. 2 is the frontier itemset, F(Xi,c) for input itemset Xi. See Table IV.

TABLE IV

| FIG. 2 INPUT: LARGE ITEMSETS | FIG. 2 INPUT: CONFIDENCE LEVEL | FIG. 2 OUTPUT: FRONTIER SETS |
|---|---|---|
| X1 | C1 | F (X1, c1) |
| X2 | C2 | F (X2, c2) |
| . | . | . |
| . | . | . |
| . | . | . |
| Xk | Ck | F (Xk, ck) |

FIG. 2, step 210 represents the software to implement the process step of receiving as input a large itemset Xi, and some user specified confidence input value, c. Step 220 initializes two lists; Outputlist to Null (empty) and FrontierList to itemset Xi. The process steps described in FIG. 2 terminate when Outputlist contains the set of all maximal ancestors of input Xi, the frontier set, F(Xi,c).

Step 230 represents the software to implement the process step of selecting the next itemset, identified as CurrentItemset, from the list, FrontierList for processing. Step 240 represents the software to implement the process step of finding qualified parents of CurrenItemset. That is, those itemsets X, which share a parent/child relationship with CurrentItemset whose associated support does not exceed a maximum support level, s(X)/c. All qualified parents of Currentitemset will be added to the list Frontierset. Step 250 is a decision step which asks if any qualified parents of CurrentItemset were found. Step 260 is the branch taken when one or more qualified parents are discovered. When the first a qualified parent of CurrentItemset is found, CurrentItemset is deleted from the list FrontierList. CurrentItemset is removed from FrontierList because it is not a maximal ancestor by virtue of having a qualified parent. In the case where the support of all parents of an itemset, Xi, are larger than the defined support s(X)/c, then the frontier set of Xi is NULL by definition.

To clarify the above process, the process steps of FIG. 2 can be further explained by example. Assume large itemset ABC at a some confidence level, c, is input to the process. Step 210 places ABC on FrontierList and initializes Outputlist to NULL. Step 230 selects itemset ABC from FrontierList and defined as CurrentItemset. Step 240 searches for any qualified parents of CurrentItemset (ABC), and if any are found, adds them to FrontierList. Assume itemsets AB and AC are found to be qualified parents of ABC. FrontierList would now contain {ABC,AB,AC}. Step 250 is a decision step which determines whether any qualified parents were found in the previous step. Since two itemsets, AB and AC were added to FrontierList, the path including step 260 is taken and itemset ABC is non-maximal and therefore deleted from FrontierList. Not having satisfied the exit condition, Outputlist remains the NULL set, the process is iterated again from step 220 with CurrentItemset now set to the next item in FrontierList, AB. Each itemset contained in FrontierList will be similarly evaluated. Outputlist will, after the final iteration, contain the set of all maximal ancestors, {A,B,C}, of input itemset ABC, the frontier set of ABC, F(ABC,c).

Once all simple redundancies have been eliminated by generating frontier sets for all large itemsets, the present invention then addresses the removal of any potential strict redundancies, see FIG. 1, step 130. Strict redundancies could arise in the case where any of the generated frontier sets were subsets of one another. The process of removing strict redundancies from the frontier sets is termed pruning the frontier sets.

To properly prune a frontier set, F(Xi,c) consider each child Xj of Xi. The frontierset of each child Xj of Xi, is generated, F(Xj,c). All member itemsets in F(Xj,c), that are also contained in F(Xi,c), are pruned from F(Xi,c). Pruning the frontier of itemset Xi insures that the frontier of Xi does not share any itemsets with the frontier of any itemset Xj, the children of Xi. The pruned frontier, P(Xi,c) is then used as input to generate a set of compact rules. That is to say, a set of association rules whereby simple and strict redundancies have been removed.

Figure 3:
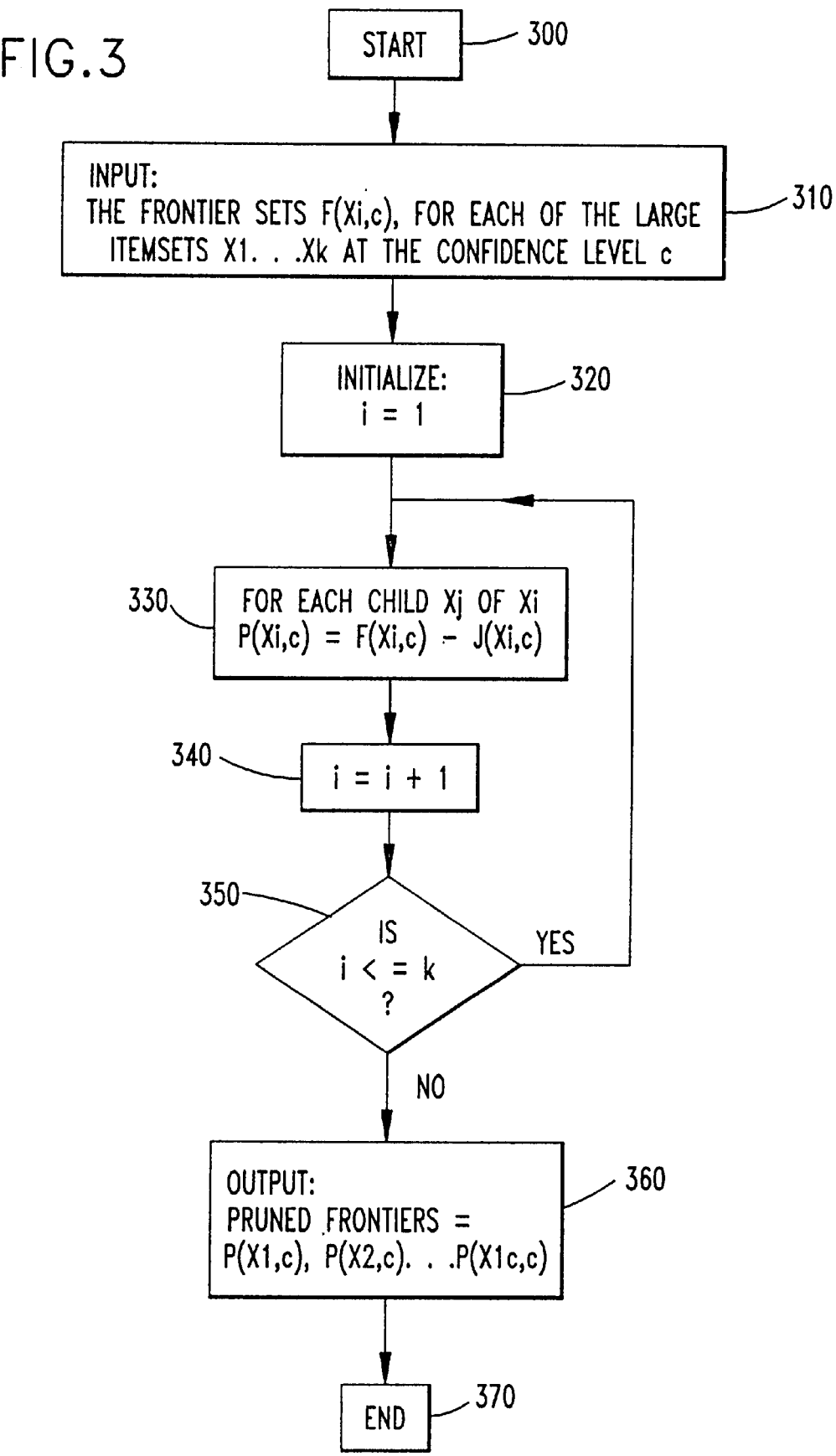
FIG. 3 is a description of how these generated frontiers are pruned. This figure can also be considered a detailed description of step 130 of FIG. 1.

FIG. 3 describes the process of pruning the input frontier itemsets, F(X1,c), F(X2,c) . . . F(Xi,c). . . F(Xk,c). Each frontier set, F(Xi,c), is independently input to the pruning procedure of FIG. 3, see Step 310. Step 320 represents the process step which initializes the process to receive as input the first Frontier set, F(Xl,c). Step 330 represents the software to implement the process step of pruning from F(Xi,c) the frontierset of the jth child of input frontierset F(Xi,c).

$$P[Xi,c]=F[Xi,c]-F[Xj,c]$$

where j=1 to # of children of Xi.

Step 340 represents the software to point the process to the next frontierset to be pruned. Step 350 represents the software to determine if there are any remaining frontier sets to be pruned. When all input frontiersets have been pruned, step 360 represents the output of the pruning process and consists of the set of pruned Frontier itemsets, P(X1,c), P(X2,c) . . . P(Xk,c). A compact subset (no simple or strict redundancies) of non-redundant association rules C, can then be generated from the pruned frontier set.

Figure 5:
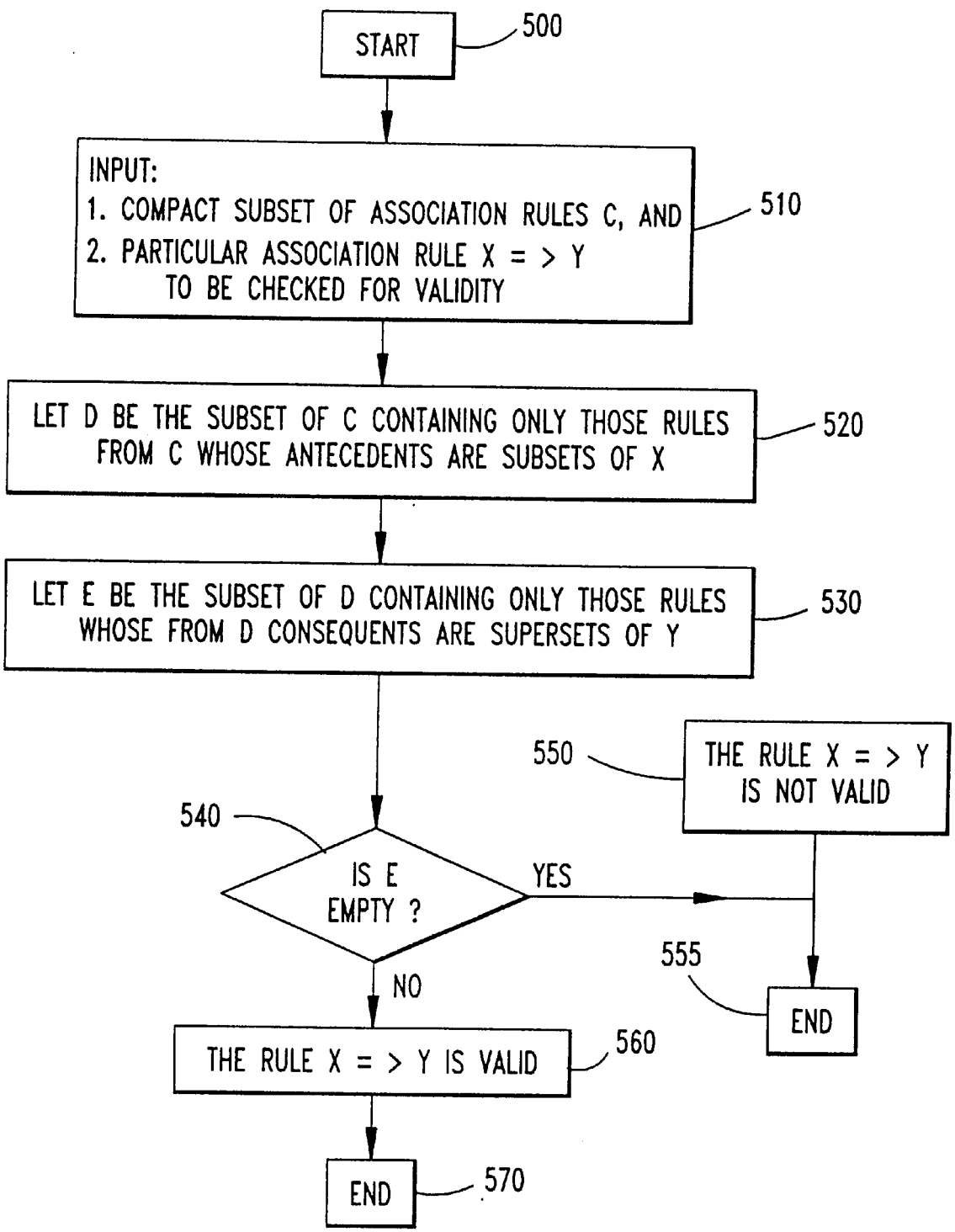
FIG. 5 is a method of checking the validity of a given association rule from the compact subset of rules.

FIG. 5 is a detailed flowchart for determining the validity of an association rule. Given as input a compact subset of association rules C, see step 510, it is desirable to check whether a rule such as X=>Y, is valid from the compact subset. Step 520 represents the software to implement the process step of finding, "D", a subset of the compact set of rules C, that satisfy the stated condition. Step 530 represents the software to implement the process step of finding, "E", a subset of the set D, that satisfies the stated condition. Step 540 is a decision step to determine if the set E is the null set, if so then the input rule, X=>Y is not valid, otherwise the rule is valid as shown in step 550.

To clarify the above process, consider the following set of compact rules, C, for example:

RULE 1 bread=>butter,milk
RULE 2 bread,cheese=>milk and consider the following association rule, with general form, X=>Y, to be checked for validity;

RULE TO BE TESTED FOR VALIDITY bread,margarine=>milk

The subset D would contain only rule 1 from the compact set C because its antecedent,bread, is a subset of X. Rule 2 is disqualified from D because its antecedent,{bread,cheese} is not a subset of X. Using the set D as input to the next stage, consider only those rules whose consequents are supersets of Y, where Y={milk} in the present example. The set D, in the present example, consists of only Rule 1 and meets the stated condition of step 530 and is included in the set E. The input rule is determined to be valid as a result of the set E being non-null.

Figure 4:
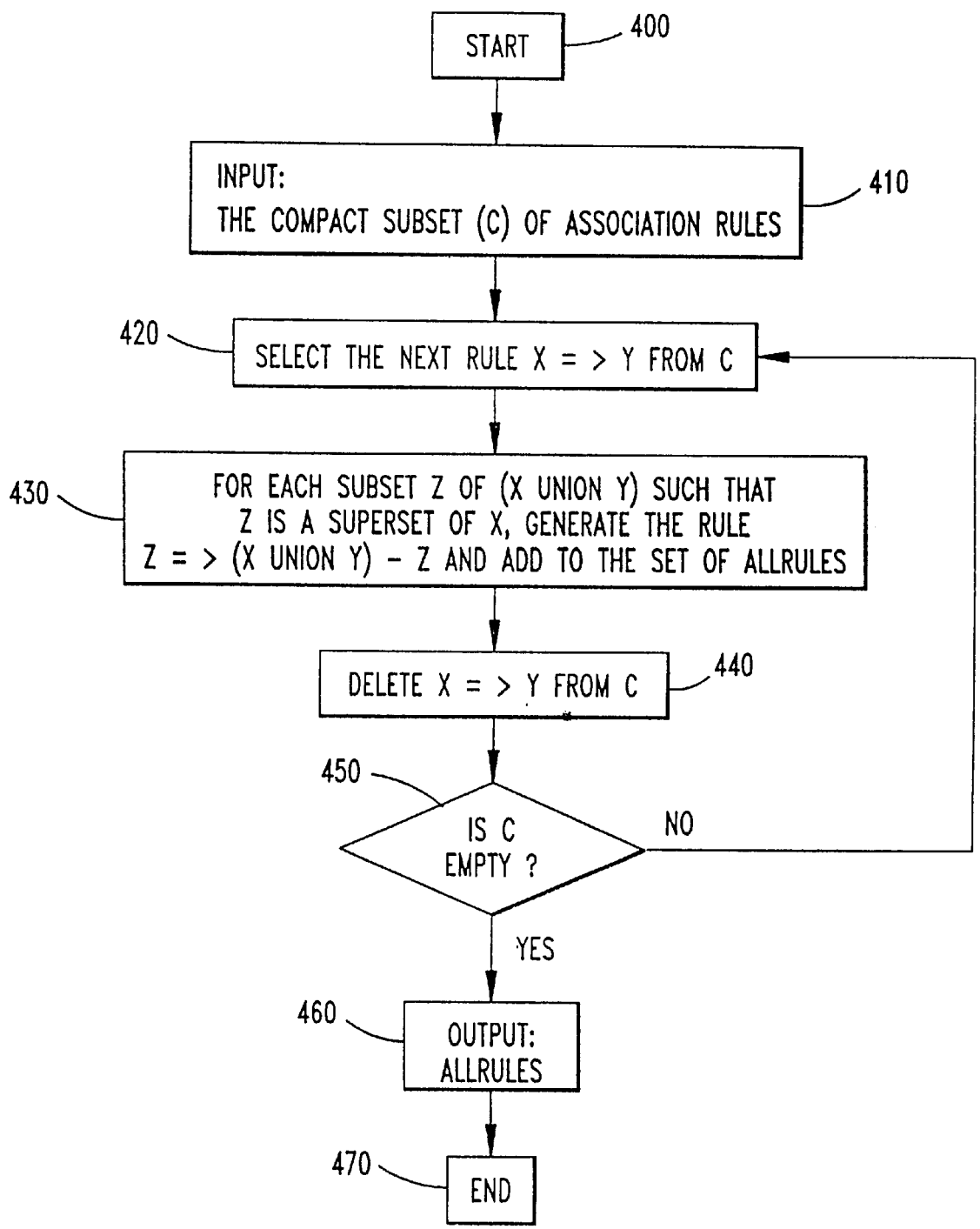
FIG. 4 is a description of how a compact subset of non-redundant rules may be used in order to generate the entire set of rules.

FIG. 4 is a detailed flowchart for finding the entire rule set from the compact subset of nonredundant rules. FIG. 4 is provided as an additional feature of the present invention to be invoked only in the circumstance where information concerning the larger rule set is desired.

We claim:

1. A computer performed process for generating a compact subset of non-redundant association rules from large item sets, comprising the steps of:

inputting to the computer, data including a plurality of large item sets, a minimum support level, and a minimum confidence level; and generating a frontier itemset corresponding to each large item set to remove simple redundancies of said large itemsets, a frontier itemset comprising a set of all maximal ancestors of said large item set; and pruning each set of frontier itemsets to eliminate strict redundancies; and generating a compact subset of non-redundant association rules from said pruned frontier itemsets.

2. The method of claim 1, wherein the step of generating a frontier itemset from each large item set further includes finding minimum antecedent sets contained in each large itemset.

3. The method of claim 1, wherein the step of pruning the frontier itemset from each large item set further includes generating the frontier itemsets for each child of said frontier itemset; and eliminating from said frontier itemset any itemset also contained in the frontier itemset of any child of said frontierset.

4. The method as claimed in claim 1, wherein a maximal ancestor (Y) of a large itemset (X) is defined as an itemset meeting a criteria:

$$s(Y)/s(X)<1/c$$

where s(Y) is a minimum support value of said itemset (Y), s(X) is a minimum support value of said large itemset (X), and c is a minimum specified confidence value.

5. The method as claimed in claim 4, wherein said maximal ancestor (Y) of a large itemset (X) is defined as an itemset meeting a criteria:

$$s(Z)/s(X)<=1/c$$

where s(X) is a minimum support value of said itemset (X), Z is an immediate parent of itemset Y, s(Z) is a minimum support value of said itemset (Z), and c is a minimum specified confidence value.

6. A computer performed process for determining whether an input association rule is valid from a generated set of compact rules comprising:

identifying a subset of association rules from the compact set of rules, where said subset contains only those rules whose antecedents are subsets of the antecedent of said input association rule; and deleting from said compact set of rules those association rules whose antecedents are not subsets of said input association rule; and identifying from said subset of association rules a further subset of association rules containing only those rules whose consequents are supersets of the consequent of said input association rule; and deleting those association rules from said subset of association rules whose consequents are not supersets of the consequent of said input association rule; and determining whether said further subset of association rules is the empty set including;

displaying a message to the user that said input association rule is invalid when said further subset is the empty set;

otherwise displaying a message to the user that said input association rule is valid when said further subset is not the empty set.

7. A computer performed process for generating all valid association rules from a compact subset of non-redundant association rules comprising:

selecting an input rule from the compact subset of association rules; and calculating the union of the antecedent and consequent of said input rule; and calculating a plurality of subsets of said union where each subset is a superset of the antecedent of said input rule; and generating a plurality of rules whereby the generation of each individual rule includes;

generating the antecedent of said generated rule where said antecedent comprises one of said plurality of subsets; and generating the consequent of said generated rule where said consequent comprises the difference between said union of the antecedent and consequent of said input rule and one of said subsets; and adding the generated rule to the set of all valid association rules; and deleting said input rule from the compact subset of association rules; and determining whether said compact subset of association rules is the empty set including;

outputting the set of all association rules when said compact subset is the empty set otherwise selecting the next input rule from the compact subset of association rules.

* * * * *